United States Patent [19]

Kim

[11] Patent Number: 5,761,370

[45] Date of Patent: Jun. 2, 1998

[54] DUAL-DECK VIDEOCASSETTE RECORDER

[75] Inventor: Sang-wook Kim, Suwon, Rep. of Korea

[73] Assignee: Samsung Electronics Co., Ltd., Kyungki-do, Rep. of Korea

[21] Appl. No.: 679,722

[22] Filed: Jul. 12, 1996

[30] Foreign Application Priority Data

Jul. 24, 1995 [KR] Rep. of Korea .................. 95-21946

[51] Int. Cl.$^6$ .................................................. H04N 9/87
[52] U.S. Cl. ............................................ 386/10; 386/25
[58] Field of Search ............................ 386/9–10, 21–22, 386/25, 44–45, 1, 4; H04N 9/79, 9/87

[56] References Cited

U.S. PATENT DOCUMENTS

| | | | |
|---|---|---|---|
| 3,947,871 | 3/1976 | Amari et al. | 358/8 |
| 5,032,902 | 7/1991 | Shibue et al. | 386/25 |
| 5,194,963 | 3/1993 | Dunlap et al. | 358/314 |
| 5,243,474 | 9/1993 | Mitsuhashi | 386/22 |

*Primary Examiner*—Andrew Faile
*Assistant Examiner*—Luong Nguyen
*Attorney, Agent, or Firm*—Sughrue, Mion, Zinn, Macpeak & Seas, PLLC

[57] ABSTRACT

A dual-deck VCR includes a delaying portion for delaying a color signal of 629 KHz reproduced from one deck by a horizontal scanning period, a color comb filter for removing crosstalk from the delayed color signal and a not-delayed color signal, a burst level processing portion for integrating the burst to output the integrated level of the burst and a color gain controller for controlling the amplitude of the color signal output from the color comb filter in response to the integrated level output from the burst level processing portion. The characteristics of the components of the dual-deck VCR are chosen so that crosstalk and a pickup noise generated from the non-uniformity of friction between head and tape are removed.

2 Claims, 2 Drawing Sheets

5,761,370

1

DUAL-DECK VIDEOCASSETTE RECORDER

BACKGROUND OF THE INVENTION

The present invention relates to a dual-deck videocassette recorder (VCR), and more particularly, to a dual-deck VCR for removing color noise generated when a tape recorded in a high density (SLP) mode is copied.

A conventional dual-deck videocassette recorder system is disclosed in U.S. Pat. No. 5,194,963. This dual-deck videocassette recorder system directly copies a good image signal picked up by a playback head in one such deck to a tape in the other deck without performing the usual demodulation and modulation process with respect to the picked-up signal. However, when a tape having an image signal recorded in an SLP mode and copied by the dual-deck VCR is reproduced, a color flicker phenomenon occurs.

Accordingly, when material which has been recorded in an SLP mode is copied from one tape in the dual-deck VCR, the signal is demodulated into a video image signal, and then the demodulated image signal is modulated again and the re-modulated signal is copied onto the tape in the other deck. This is the same copying method normally used in a VCR.

FIG. 1 is a block diagram for illustrating a conventional dual-deck VCR.

Referring to FIG. 1, the dual-deck VCR includes a playback head 100, a playback amplifier 120, a first high-pass filter (HPF) 140, a drop-out compensator 160, a limiter 180, a second HPF 200, a mixer 220, a low-pass filter (LPF) 240, an amplifier 260, a record amplifier 280 and a record head 300.

In operation of the circuit shown in FIG. 1, an image signal picked up from the playback head 100 is amplified in the playback amplifier 120, and then the amplified image signal is output to the first HPF 140. The first HPF 140 cuts off a color signal with a chrominance subcarrier having a frequency of 629 KHz and passes a luminance signal of 1.3 MHz or higher to the drop-out compensator 160. Here, when the image signal cannot be smoothly reproduced due to video tape damage or contact failure of the playback head 100, screen quality is deteriorated due to a "drop-out" phenomenon in which white (or black) horizontal lines appear on the screen during playback.

When this drop-out occurs, the drop-out compensator 160 compensates for the drop-out using the image signal of one horizontal scanning period immediately preceding the occurrence of the drop out, and outputs the compensated image signal to the limiter 180.

The limiter 180 removes the amplitude variation occurring due to contact failure and a characteristic difference between a tape and the playback head 100 during reproduction and then outputs the image signal to the second HPF 200. The second HPF 200 passes only the luminance signal components of 1.3 MHz or higher and outputs the filtered signal to the mixer 220.

Meanwhile, signals output from the playback amplifier 120 are provided to the LPF 240. The LPF 240 outputs color signals having a frequency below 1.2 MHz to the amplifier 260. The amplifier 260 amplifies the received signals and outputs the amplified signals to the mixer 220.

The mixer 220 mixes the luminance signal of 1.3 MHz or higher with the color signal of 629 KHz and outputs the mixed signal to the record amplifier 280. The record amplifier 280 amplifies the mixed signal and outputs the amplified signal to the record head 300 which records the amplified signal on a tape. Accordingly, in the dual-deck VCR, the image signal picked up by the playback head 100 and reproduced is directly recorded on a tape without a demodulating process.

When a tape recorded in the SP mode of a normal density record is reproduced, that is, when a head having widths of approximately 60 μm (channel 1) and 40 μm (channel 2) travels on a track having a width of approximately 59 μm, the track has a guard band so that an image signal recorded on an adjacent track cannot interfere with the image signal being picked up. However, when a tape recorded in the SLP mode (i.e., a high density) is reproduced, a head having a width of approximately 30 μm (channels 1 and 2) travels on a track having a width of approximately 19 μm. Thus, the track cannot have a guard band, and the interference of an adjacently recorded image signal produces crosstalk.

The crosstalk and the variation of magnetic pickup by non-uniform friction between the tape and the head causes the color flicker phenomenon.

SUMMARY OF THE INVENTION

Accordingly, it is an object of the present invention to provide a dual-deck VCR for removing the color noise generated when a tape recorded in an SLP mode is copied.

To accomplish the above object, there is provided a dual-deck VCR including a luminance signal processor for processing the luminance signal being reproduced from one deck, a chrominance signal processor, a low-pass filter for passing a color signal from the reproduced signals, which are received from the first deck, a delaying portion for delaying the received color signal from the low-pass filter by a horizontal scanning period, a color comb filter for removing crosstalk from the delayed color signal in the delaying portion and a color signal filtered via the low-pass filter, a burst level processing portion for detecting a burst from the output of the color comb filter and integrating the burst to output the integrated level of the burst, and a color gain controller for controlling the amplitude of the color signal output from the color comb filter in response to the integrated level output from the burst level processing portion and providing the amplitude-controlled color signal to the mixer.

BRIEF DESCRIPTION OF THE DRAWINGS

The above object and advantages of the present invention will become more apparent by describing in detail a preferred embodiment thereof with reference to the attached drawings in which.

DETAILED DESCRIPTION OF THE INVENTION

Figure 2:
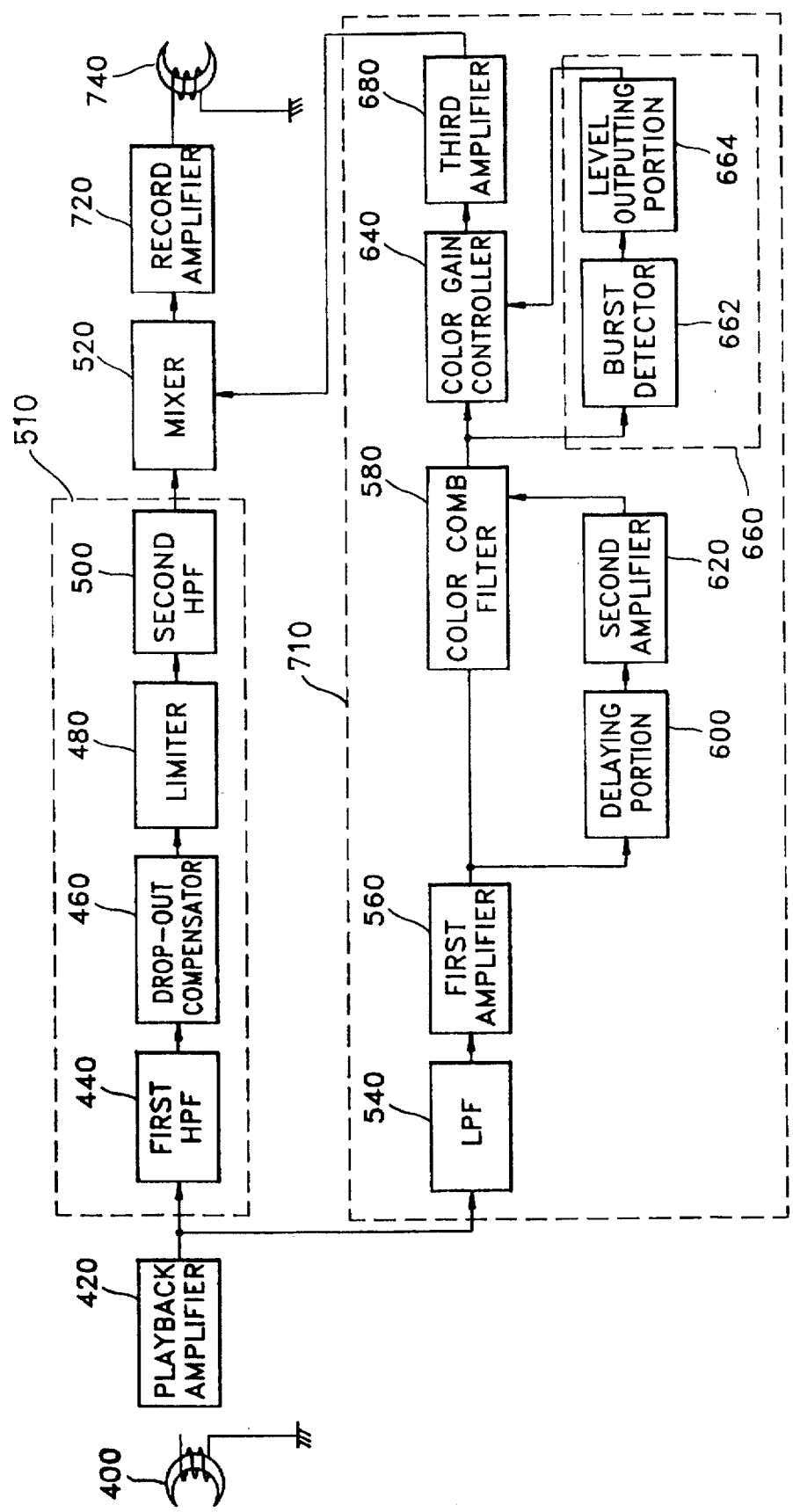
FIG. 2 is a block diagram for illustrating a dual-deck VCR according to the present invention.

Referring to FIG. 2, the dual-deck VCR includes a playback head 400, a playback amplifier 420, a luminance signal processor 510, a chrominance signal processor 710, a mixer 520, a record amplifier 720, and a record head 740. Here, the luminance signal processor 510 includes a first high-pass filter (HPF) 440, a drop-out compensator 460, a limiter 480 and a second HPF 500. The chrominance signal processor 710 includes a low-pass filter (LPF) 540, a first amplifier 560, a color comb filter 580, a delaying portion 600, a second amplifier 620, a color gain controller 640, a burst level processing portion 660 and a third amplifier 680. Also, the burst level processing portion 660 includes a color burst detector 662 for detecting a burst from a color signal, and a level outputting portion 664 for integrating the detected burst level and outputting the integrated burst level.

Figure 1:
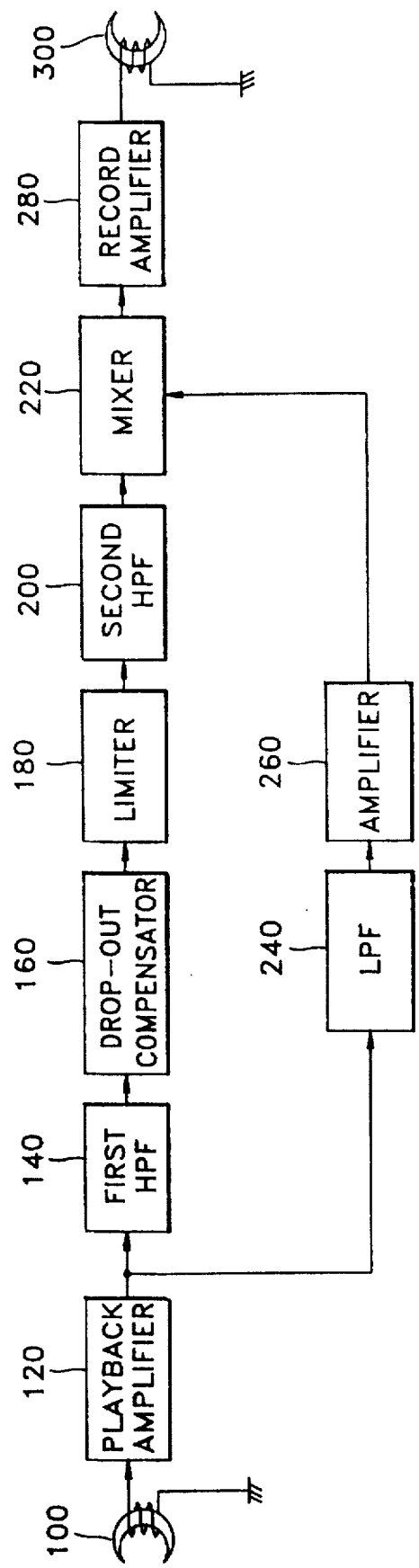
FIG. 1 is a block diagram for illustrating a conventional dual-deck VCR.

In operation of the circuit shown in FIG. 2, an image signal picked up from a tape through the playback head 400 is output to the second HPF 500 in the same signal processing manner as the conventional method of FIG. 1. The second HPF 500 passes only the luminance signal of 1.3 MHz or higher and outputs the filtered signal to the mixer 520.

Meanwhile, a reproduced color signal passed through LPF 540 is amplified in the first amplifier 560 and then output to the color comb filter 580 and the delaying portion 600. The delaying portion 600 delays the color signal with a chrominance subcarrier of 629 KHz for one horizontal synchronizing period and then outputs the delayed signal to the second amplifier 620. The second amplifier 620 amplifies the delayed color signal and then outputs the amplified color signal to the color comb filter 580. The color comb filter 580 passes the color signal below 1.2 MHz and subtracts or adds a phase shifted signal in angles of +90 and −90 by a head switch (not shown) from or to the delayed color signal to remove the noise due to the crosstalk from the reproduced image signal. The color signal from which the crosstalk is removed is phase-shifted in order to correspond to an original record phase and then the phase-shifted signal is output to the color gain controller 640 and the burst detector 662. The burst detector 662 detects a burst from the color signal and outputs the detected burst to the level outputting portion 664. The level outputting portion 664 integrates the detected burst and then outputs the integrated burst level to the color gain controller 640. The color gain controller 640 controls an amplitude of the color signal in response to the integrated burst level from the level outputting portion 664 to remove fluctuation of the color signal level. The controlled color signal is then output to the third amplifier 680 and the amplified signal is output to the mixer 520. The mixer 520 mixes the color signal with the luminance signal and then outputs the mixed signal to the record amplifier 720. The record amplifier 720 amplifies the mixed signal in conformance with the characteristics of the record head 740. The record head 740 records the amplified signal on a tape.

The dual-deck VCR of the present invention copies an image signal removing the crosstalk and compensating for the pickup variation of the head due to non-uniform friction between the head and a tape, so that color flicker, which occurs on a screen during reproducing of the tape copied in an SLP mode, can be prevented.

What is claimed is:

1. A dual-deck VCR having a luminance signal processor for processing a luminance signal being reproduced from a first deck, a chrominance signal processor for processing a color signal being reproduced from said first deck, and a mixer for mixing outputs of said luminance and chrominance signal processors and providing the mixed signal to a tape of a second deck, wherein said chrominance signal processor comprises:

a low-pass filter for passing the color signal from the reproduced signals which are received from said first deck;

a delaying portion for delaying the received color signal from said low-pass filter by a horizontal scanning period;

a color comb filter for removing crosstalk from the delayed color signal in said delaying portion and the color signal passed by said low-pass filter;

a burst level processing portion for detecting a burst from the output of said color comb filter and integrating the burst to output an integrated level of said burst; and a color gain controller for controlling the amplitude of the color signal output from said color comb filter in response to the integrated level output from said burst level processing portion and providing the amplitude-controlled color signal to said mixer.

2. A dual-deck VCR according to claim 1, wherein said color comb filter comprises a filter which passes a color signal below 1.2 MHz.

* * * * *